(12) United States Patent
Schulte et al.

(10) Patent No.: US 7,879,425 B2
(45) Date of Patent: Feb. 1, 2011

(54) TRIM PART WITH DECOR SURFACE

(75) Inventors: Frank Schulte, Ingolstadt (DE); Alexander Klink, Heilbronn (DE)

(73) Assignees: Faurecia Innenraum Systeme GmbH, Hagenbach (DE); Moldware Konstruktion Produktentwicklung und Design GmbH, Wendel (DE)

( * ) Notice: Subject to any disclaimer, the term of this patent is extended or adjusted under 35 U.S.C. 154(b) by 484 days.

(21) Appl. No.: 11/573,082

(22) PCT Filed: Sep. 23, 2005

(86) PCT No.: PCT/EP2005/010571

§ 371 (c)(1),
(2), (4) Date: Jan. 28, 2008

(87) PCT Pub. No.: WO2006/032540

PCT Pub. Date: Mar. 30, 2006

(65) Prior Publication Data

US 2008/0260987 A1    Oct. 23, 2008

(30) Foreign Application Priority Data

Sep. 23, 2004   (DE) .................. 10 2004 047 495

(51) Int. Cl.
*B32B 3/06*   (2006.01)
*B32B 3/10*   (2006.01)
*B60J 5/00*   (2006.01)

(52) U.S. Cl. .............. 428/100; 428/138; 428/172; 296/146.7

(58) Field of Classification Search .......... 428/172, 428/192, 540, 904, 100, 138; 296/146.7
See application file for complete search history.

(56) References Cited

U.S. PATENT DOCUMENTS

| 4,779,390 | A | | 10/1988 | Repper et al. |
| 5,811,053 | A | * | 9/1998 | Ota et al. ............. 264/511 |
| 5,922,431 | A | | 7/1999 | Funato et al. |

FOREIGN PATENT DOCUMENTS

| DE | 10020525 | 10/2001 |
| DE | 10125074 | 11/2002 |
| DE | 10140873 | 3/2003 |
| DE | 10244311 | 4/2004 |
| DE | 202004003134 | 7/2004 |

\* cited by examiner

*Primary Examiner*—Donald Loney
(74) *Attorney, Agent, or Firm*—Fay Kaplun & Marcin, LLP

(57) ABSTRACT

A trim panel includes a decorative surface, one sub-section of which consists of leather. The trim panel consists of a flat support that also covers the sub-section and at least one additional layer on a visible face of the support. In addition, the layer is recessed in the sub-section or doubles back on itself towards the sub-section along one edge of the latter. A leather trim is located on the visible face of the support in the sub-section, the trim covering the latter.

10 Claims, 1 Drawing Sheet

TRIM PART WITH DECOR SURFACE

FILED OF INVENTION

The invention relates to a trim part with a decor surface, which is formed in a part region of leather, according to the preamble of the main claim. The invention further relates to a method for manufacturing such trim parts.

BACKGROUND INFORMATION

A trim part, which in particular may be used as an inner trim part for a motor vehicle, comprises a two-dimensional (shell-like) carrier and at least one further layer on a viewed side on the carrier, wherein the carrier also spans the part region. Such a trim part for example is shown in the document DE 101 25 074 A1. With this trim part, non-leathered regions are given on account of additional components with individual functions, such as for example a middle console with operating elements, or air exit openings for a ventilation system.

On the other hand, according to the state of the art, it is not known to design only individual of several regions of the decor surface of a trim part which per se is of one part, when required, thus depending on design, of leather, and to design the other regions of a different decor material. It is the object of the present invention to indeed realise such a trim part, which in this context is only leathered in regions. It is furthermore the object of the invention to suggest a method with which, with the lowest possible effort, trim parts corresponding to one another may be manufactured in part-leathered embodiments as well as in embodiments with different, and in particular uniform surface decors.

SUMMARY OF INVENTION

According to the present invention, the part-leathered trim part according to wishes is realised in that the further layer arranged on the carrier is recessed in the part region designed in a leathered manner, or returns back towards the part region along an edge of the part region, wherein a leathered cover covering the part region is arranged on the viewed side of the carrier, in the part region. The mentioned further layer thus, in the part region, inasmuch as it is not completely recessed there, has at least a reduced thickness with respect to a corresponding trim part without the leathered cover. The carrier which should also span over the part region, with typical embodiments of the invention, is manufactured for example from plastic containing polypropylene and also possibly from a plastic reinforced with glass fibre, and is advantageously designed as an injection moulded part. Thereby, the carrier should then also be described as spanning the part region when it has a single opening there, for example for fastening the cover.

A particular advantage of the invention lies in the fact that with an inventive design of part-leathered trim parts, such partly leathered trim parts as well as correspondingly shaped trim parts with a uniform decor surface enclosing the part region (as a rule then not of leather), may be manufactured with extremely little effort. This advantage takes full effect when in a product program with regard to its surface design, one provides differently complex, but otherwise similar and exchangeable trims. A typical case is an offer of a vehicle type with differently complexly designed interiors. In particular, one may use identically designed carriers for the trim parts which are part-leathered in the described manner, as well as correspondingly shaped trim parts with a differently designed surface.

One method which is advantageous in the described context, with which part-leathered trim parts of the described manner as well as correspondingly shaped trim parts without a leathered region are manufactured, may accordingly envisage identically designed carriers being used, which in different foaming tools are provided with a further layer which is recessed in the part region or returns back towards the part region along an edge of the part region, or however with a further layer which is not recessed in this manner, depending on the design. The foaming tools which are different depending on the design, may thereby also be realised in that only a single of several tool parts, for example a tool half, is exchanged, or that a cavity of a foaming tool used normally for trim parts with a uniform decor surface, is accordingly reduced in size by an insert for the manufacture of a trim part which is to comprise a leathered cover in the described manner.

One preferred embodiment of a trim part according to the invention which is preferred with regard to an as simple as possible manufacture, envisages the leathered cover being placed onto the carrier and, if need be, being firmly connected to this at locations. The trim part may even be designed such that the cover may be placed on and removed in a reversible manner. In order to ensure a secure seat of the cover on the trim part or on the carrier, the cover may be screwed, welded and/or riveted onto the trim part. Alternatively or also additionally to this, the cover may be connected to the trim part or the carrier by way of a clamping connection.

A particularly advantageous outer appearance of the part-leathered trim part results when a viewed surface of the cover terminates in a flush manner with the decor surface outside the part region, at least along a part of the edge of the part region. This may be realised without any problem, since the further layer arranged on the carrier is recessed in the part region, or returns back towards the part region at least along the edge of the part region.

With designs of trim parts because of the corresponding type, which are particularly advantageous since they may be manufactured with little effort, the at least one further layer may include a layer of a foamed material, for example of polyurethane foam. This layer typically connects the carrier to the surface decor which is provided outside the part region. With regard to this surface decor, it may for example be the case of a cast skin—typically likewise of polyurethane—, a sintered skin, a fabric, a knitted fabric or woven fabric, materials which may form the decor surface outside the part region. In the case of a use of a fabric tissue, a knitted fabric, a woven fabric or another porous material, it may be helpful to back the surface decor with a sealing film.

The cover, in an advantageous manner, may comprise a shaping, two-dimensional substrate—thus also a carrier—, over which a leather layer is arranged. This substrate or carrier part may also be designed of plastic, for example at least partly of polypropylene, and possibly reinforced with glass fibre, with a view to a simple manufacture possibly as an injection moulded part. Under certain circumstances, the cover has a geometry, with which a single-part manufacture of the substrate as an injection moulded part is difficult or impossible. If this is the case, the substrate may also be manufactured of several parts (two parts as a rule should be sufficient), wherein several parts of the substrate may for example be welded to one another. This is conceivable for the case that with the trim part, it is the case of an instrument panel or a part of an instrument panel—a typical application example for the present invention—wherein the part region is defined by a scoop accommodating instrument dials. Designs with which the leathered cover forms or covers a scoop, are preferred, since such a scoop typically forms an eye-catcher on an instrument panel, with which a noble design is accentuated.

The cover may furthermore be designed such that at least in regions, a spacer fabric and/or a foam layer is arranged between the substrate and the leather layer, by which means pleasant haptic properties may be realised. The use of a spacer fabric, instead of which fabric tapes or mats may also be applied for example, is particularly advantageous, since it ensures a strong tensile connection between the substrate and the leather layer or the layer covering, also with difficult climatic conditions which are typical of instrument panels. Additionally or alternatively to this, one may envisage the substrate and/or a further layer arranged between the substrate and the leather (e.g. a foam layer or a spacer fabric) comprising a recess which accommodates a part of a seam of the leather layer which projects at the rear from the leather layer. By way of this, one may provide midget seams which are comparatively simple to realise, between parts of the leather layer, without these having to be deposited onto the decor surface in an unpleasant manner. Apart from such seam furrows, one may also provide other positioning aids for the leather layer on or in the substrate and/or an additional layer.

With regard to the logistics on manufacture of the trim part, instead of the complete trim part (for example an instrument panel), the leathered cover may be exclusively covered at the supplying company, and subsequently delivered on a tape as a feed part. On the one hand, this reduces the logistic effort, and on the other hand, in the case of any occurring deficiency, the cause may be clearly determined.

The advantages with the use of a leathered cover with its own substrate or carrier part for the part region to be leathered, is to be seen in that edge stiffening with a constant radii quality is able to be designed in accordance with the leather, that the effort on manufacture of the covering are able to be kept low, since one may process midget seams, that positioning aids such as for example seam furrows may be provided with regard to design on the substrate or carrier part of the cover, and that a material selection independent of the remaining trim part may be made for the substrate or the carrier part of the leathered cover, wherein otherwise a carrier which may be applied unchanged also for other designs of the trim part may be used. Thereby, one should take into account the fact that materials which may be leathered particularly well, are not necessarily suitable as carrier materials for quite large-surfaced trim parts, and vice versa, so that possibly advantageously different materials are to be selected for the carrier of the trim part and the substrate of the cover, which is rendered possible by the present invention. Compared to a leathering of rear-foamed components, there result further disadvantages by way of the fact that—with the exception given a very high foam hardness—with the latter, as a rule no adequate support in particular at edges is present, that with normal rear-foamed components furthermore the effort on manufacture of the covering is high, since the seam threads need to be skived and rebonded in regions, so that they do not open on the surface, that chemical reactions of a skin-foam composite may have negative effects on the applied adhesives, by which means appearances of detachment of the leather may occur, and that with conventionally leathered components without positioning aids on the carrier side, a positioning of the leather and possible seams needs to be effected via auxiliary tools with some effort. Finally, one should mention the advantage of the present invention that an optimal carrier material may be selected for the leathered cover. An optimal material selection is finally possible also for adhesive layers, which may be provided between the substrate and the leather layer, between the substrate and a further layer, such as for example a spacer fabric and/or between this further layer and the leather layer.

According to its function, and the materials, the carrier covering the part region, as well as the substrate of the cover ensures the mechanical stability and the shape of the respective components, i.e. the substrate and carrier are suitably rigid or stiff and have an adequate thickness. In particular, by way of the use of a rigid, shape-providing substrate as a component of the cover, it is no longer necessary for the cover to be in large-surfaced contact with the carrier covering the part region, in order to secure the necessary mechanical stability and the maintenance of the shape. It is thus possible to design covers with different shapes, with which intermediate spaces between the carrier and the substrate may occur, without the mechanical stability of the component from suffering.

BRIEF DESCRIPTION OF DRAWINGS

One embodiment of the present invention is explained hereinafter by way of the FIGS. 1 and 2. There are shown in.

DETAILED DESCRIPTION

Figure 1:
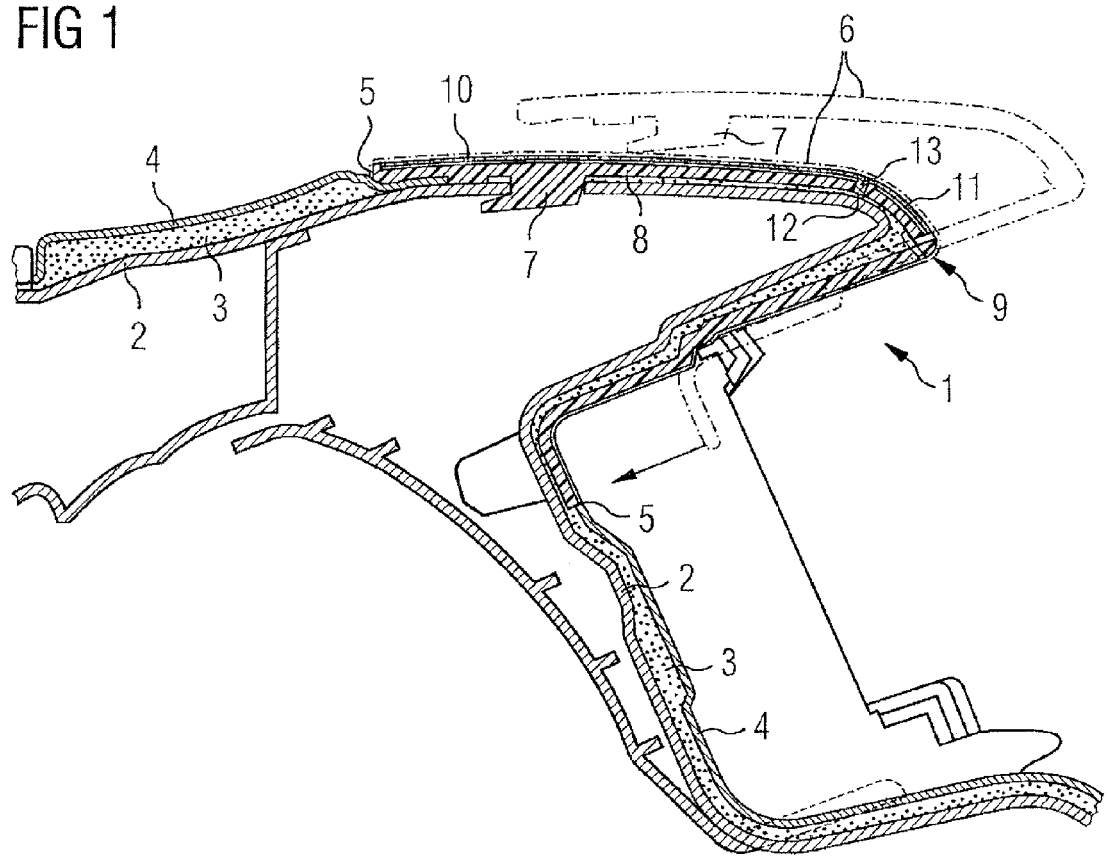
FIG. 1 shows a cross section through a trim part according to an exemplary embodiment of the present invention, which forms an instrument panel.

In FIG. 1, a cross section through an instrument panel for a motor vehicle is shown, which in a part region 1 forms a scoop (for accommodating instrument displays). The instrument panel comprises a two-dimensional carrier 2 also spanning this part region 1, of a polypropylene-containing, glass-fibre reinforced plastic. A further layer 3 of a polyurethane foam is arranged on the carrier 2 outside the part region 1, and this layer connects the carrier 2 to a cast skin 4 which outside the part region 1 forms a decor surface of the instrument panel. This cast skin 4 is likewise formed of polyurethane. In the same manner, instead of the cast skin 4, one may also provide a sinter skin, a fabric, a woven material or knitted material as a decor surface outside the part region 1, possibly backed by a sealing film.

The layer 3 of polyurethane foam is recessed within the part region 1. In the same manner it would be possible to design the layer 3 such that it does not fully recess the part region 1, but only returns back towards the part region 1 along an edge 5 of the part region 1. Now, a leathered cover 6 covering the part region 1 is arranged on the viewed side of the carrier 2, in the part region 1. This cover 6 is placed onto the carrier 2 and is only firmly connected to this at locations. A connection of the cover 6 to the carrier 2 and thus to the instrument panel firstly comes into being on account of a clamping connection by way of a hook 7, which is integrally formed onto the cover 6 at the rear side, which engages through an opening in the carrier 2, and engages behind the carrier 2 by way of this. Additionally, a few weld connections are provided between the cover 6 and the carrier 2. Additionally or alternatively, the aperture 6 may also be screwed and/or riveted onto the carrier. It is also possible to exclusively use a clamping connection between the cover 6 and the carrier 2, such that the cover 6 may be applied and removed in a reversible manner. The cover 6 which in FIG. 1 is imaged in an assembled position as well as (dashed) in a position before the placing-on, is dimensioned such that a viewed surface of the cover 6, which is formed of leather, at least along a part of the edge 5 of the part region 1, terminates with the decor formed by the cast skin 4, in a flush manner outside the part region 1.

The cover 6 as a shape-providing substrate 8 comprises a two-dimensional carrier part of an injection-moulded plastic. With regard to the plastic, it may thereby be the case e.g. of PC/ABS or another high-quality plastic. On account of the geometry, this carrier part is composed of two individual injection-moulded parts which are welded to one another in an edge region 9. A leather layer 10 which is bonded to the substrate 8 is arranged above this substrate, and within the part region 1 forms the decor surface of the instrument panel, wherein at locations between the leather layer 10 and the substrate 8, there is arranged a spacer fabric 11 which gives the instrument panel pleasant haptic properties in the region of the scoop covered or formed by the cover 6. Instead of a spacer fabric 11, one may also provide a foam layer or other tissue tapes or mats. Finally, elongates recess 12 are formed into the substrate 8 at locations, which serve as seam furrows and in each case accommodate a part of a seam 13 of the leather layer 10 projecting from the leather layer 10 at the rear side.

Figure 2:
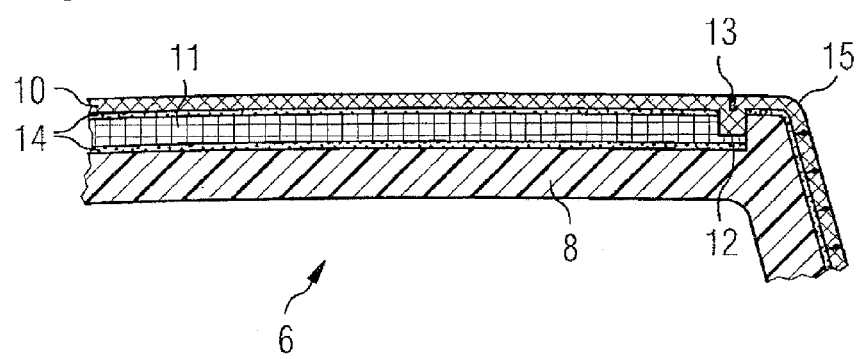
FIG. 2 shows likewise as a cross section, a part of a leathered cover belonging to this trim part.

One cut-out of the cover 6 from FIG. 1 is shown in FIG. 2. There, one may again recognise the substrate 8 and the leather layer 10, as well as the spacer fabric 11 which is arranged at locations between the substrate 8 and the leather layer 10. The spacer fabric 11 thereby ends at a location at which the leather layer 10 comprises a seam 13, which is designed as a midget seam. A part of this seam 12 projecting at the rear from the leather layer 10 thereby comes to lie in a recess 12 which is formed by way of a suitable shaping of the substrate 8 from this and an edge of the spacer fabric 11. In each case, an adhesive layer 14 is provided between the spacer fabric 11 and the substrate 8, as well as also between the spacer fabric 11 and the leather layer 10. The leather layer 10 is bonded directly onto the substrate 8 at other locations. Finally, the substrate 8 is shaped at an edge 15 of the cover 6 such that it sets a precise edge geometry.

The carrier 2 with the explained embodiment example is fashioned such that unchanged, it may also be used for instrument panels of the same shape which are designed differently, with which the part region 1 is not to be leathered differently from the other regions. For this, it is envisaged to further process an identically designed carrier 2 in another foaming tool, so that the part region 1 differently from the embodiment example shown here, is not recessed, wherein the scoop obtains a decor surface which is identical with regions outside the part region 1. By way of this, with an extremely low effort, one may manufacture instrument panels of the same shape, which are provided for the installation in vehicles of the same vehicle type, in different embodiments—with or without leathering in the part region 1—with the use of identical as possible components. Thereby, one only uses different foaming tools, possibly even only different tool parts (for example by way of exchange of only one tool half) for an otherwise identical foaming tool. It is also possible to use a single foaming tool, into which an insert is introduced for the manufacture of an instrument panel with a leathered region 6, said insert reducing in size a cavity of the foaming tool, in order to keep free the space necessary for the cover 6.

The invention claimed is:

1. A trim part having a decor surface which is formed in a part region of leather, comprising:
   a two-dimensional carrier which spans the part region;
   at least one further layer on a viewed side on the carrier, the further layer being one of (i) recessed in the part region and (ii) returning back towards the part region along an edge of the part region; and
   a leathered cover covering the part region and being applied on the viewed side of the carrier, in the part region, the cover having a shape providing two-dimensional substrate over which a leather layer is arranged, the cover being firmly connected to the carrier only at predetermined locations,
   wherein a connection of the cover to the carrier is effected using a hook, which is integrally cast with the substrate at a rear side of the substrate and which engages through an opening in the carrier.

2. The trim part according to claim 1, wherein a viewed surface of the cover, at least along a part of the edge of the part region, terminates flush with the decor surface outside the part region.

3. The trim part according to claim 1, wherein the cover is at least one of screwed, welded and riveted onto the carrier.

4. The trim part according to claim 1, wherein the cover is connected to the carrier using a clamping connection.

5. The trim part according to claim 1, wherein the at least one further layer includes a layer of a foamed material.

6. The trim part according to claim 1, wherein the decor surface outside the part region is formed by one of a cast skin, a sinter skin, a fabric, a woven material and a knitted material.

7. The trim part according to claim 1, wherein at least in locations, at least one of a spacer fabric and a foam layer is arranged between the substrate and the leather layer.

8. The trim part according to claim 1, wherein the substrate has a recess which accommodates a part of a seam of the leather layer, the part projecting at the rear from the leather layer.

9. The trim part according to claim 1, wherein the trim part is one of an instrument panel and a part of an instrument panel.

10. The trim part according to claim 9, wherein the part region is defined by a scoop.

* * * * *